United States Patent [19]

Recasens et al.

[11] Patent Number: 5,002,749

[45] Date of Patent: Mar. 26, 1991

[54] PROCESS FOR THE MANUFACTURE OF ZIRCONIUM OXIDE HYDRATE FROM GRANULAR CRYSTALLIZED ZIRCONIUM OXIDE

[75] Inventors: Joseph Recasens, Sorgues; Daniel Urffer, Morieres; Pierre Ferlanda, Le Pontet, all of France

[73] Assignee: Societe Europeenne des Produits Refractaires, Courbevoie, France

[21] Appl. No.: 324,708

[22] Filed: Mar. 17, 1989

[30] Foreign Application Priority Data

Mar. 22, 1988 [FR] France .................................. 88 03681

[51] Int. Cl.$^5$ .............................................. C01G 25/02
[52] U.S. Cl. .................................................... 423/608
[58] Field of Search .......................................... 423/608

[56] References Cited

U.S. PATENT DOCUMENTS

| | | | |
|---|---|---|---|
| 1,755,512 | 4/1930 | Monk | 423/608 |
| 4,808,397 | 2/1989 | Albizzati | 423/608 |
| 4,810,680 | 3/1989 | Beckford | 423/608 |

Primary Examiner—Peter D. Rosenberg
Attorney, Agent, or Firm—Watson, Cole, Grindle & Watson

[57] ABSTRACT

A process for the preparation of zirconia hydrate from zirconia by reaction of the latter with solid sodium hydroxide at 550°–1,400° C. to form Na zirconate; hydrolysis of the latter to form a suspension of zirconia hydrate in aqueous sodium hydroxide; separation of most of the aqueous sodium hydroxide; treatment of the zirconia hydrate containing residual aqueous sodium hydroxide with an ammonium salt; and separation, washing and dewatering of the purified zirconia hydrate obtained.

The zirconia hydrate can be used for the preparation of zirconium compounds.

10 Claims, No Drawings

PROCESS FOR THE MANUFACTURE OF ZIRCONIUM OXIDE HYDRATE FROM GRANULAR CRYSTALLIZED ZIRCONIUM OXIDE

The invention relates to a process for the manufacture of zirconium oxide hydrate from granular crystallized zirconium oxide.

The manufacture of pure and reactive synthetic zirconium oxides (also called zirconias hereinafter) and of chemical compounds of zirconium in solution or soluble in various media generally involves an intermediate synthesis of zirconium oxide hydrate. This is a compound made up of $ZrO_2$ and water, in variable concentration, sometimes called zirconium hydroxide, although it does not correspond to the specific formula $Zr(OH)_4$.

To ensure that the zirconium oxides have good dispersibility properties, the precursor zirconium oxide hydrate must be granular in form.

Known processes for the manufacture of zirconium oxide hydrate are generally based on the conversion of natural zircon sand, consisting essentially of zirconium silicate. They have been reviewed in the paper by F. Farnworth et al., "The Production, Properties and Uses of Zirconium Chemicals", published in the special publication by the Royal Society of Chemistry, No. 40, pages 248–284, (1981). These processes, which are intended to remove silicon oxide, have the disadvantage of giving rise to numerous by-products which are difficult to upgrade and of comprising a large number of intermediate steps before the zirconium oxide hydrate is obtained in a sufficient degree of purity (total impurities below 3%).

Thus, the process which is most commonly employed to manufacture pure zirconium oxide hydrate is the following:

A mixture of natural zircon and of solid sodium hydroxide is produced, followed by a baking operation, at a temperature which is generally between 600° and 900° C. The following reaction takes place:

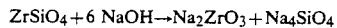

$ZrSiO_4 + 6\ NaOH \rightarrow Na_2ZrO_3 + Na_4SiO_4$

The reaction is generally incomplete. Residues of unconverted zircon (3 to 10%) remain in the synthesized product. Additional operations are needed to remove them.

The baked mixture is reacted with water (hydrolysis); the following reaction then takes place:

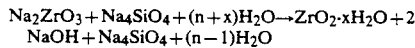

$Na_2ZrO_3 + Na_4SiO_4 + (n+x)H_2O \rightarrow ZrO_2 \cdot xH_2O + 2 NaOH + Na_4SiO_4 + (n-1)H_2O$ The zirconia hydrate formed is in suspension in a solution of sodium silicate and hydroxide. It is separated off by filtration. This compound has a high specific surface area. It fixes large quantities of sodium and of silicon by adsorption of the sodium silicate solution. The filtered product additionally contains solid residues of unconverted zircon. When this process is used, the zirconia hydrate obtained at this stage is highly impure (5 to 10% $SiO_2$, 2 to 8% $Na_2O$). Its purification is performed by dissolving in an acid, generally hydrochloric acid. A solution of zirconium oxychloride is formed by adding two moles of HCl per mole of $ZrO_2$, from which the solid impurities (zircon, silica) are separated by filtration. A solid basic zirconium sulfate is then formed by precipitation by adding sulfuric acid to the zirconium oxychloride solution in a proportion of 0.5 to 0.8 moles of $H_2SO_4$ per mole of $ZrO_2$. During this precipitation, the sodium is removed in the supernatant solution. The basic zirconium sulfate is then converted into solid purified zirconia hydrate by bringing into contact with an alkaline solution, generally aqueous ammonia. In this usual process, the zirconium oxychloride solution is not converted directly into zirconia hydrate, although this is chemically possible.

A gelatinous zirconia hydrate would, in fact, be obtained, which is difficult to handle and rich in chlorine in the case of the use of economically viable concentrated solutions. The intermediacy of the basic zirconium sulfate ensures that the zirconia hydrate is granular in form, as required in practice. This oxide hydrate generally contains sulfates which are not extracted in the last phase in a proportion of 0.3 to 5%. These sulfates can present a problem in use, their release entailing the formation of corrosive acids in the case where the oxide hydrate is heated pure or in a mixture.

There is therefore a need for a process for the manufacture of zirconium oxide hydrate which is more direct and more economical in use.

The invention is aimed at satisfying such a need and provides a process for the manufacture of zirconium oxide hydrate which makes it possible:

to greatly limit the number of intermediate steps, and hence the complexity and the cost of the process and of the production plants, to very greatly reduce, or even to eliminate, the usage of reactants, and as a consequence of both these facts, to limit the number and quantity of wastes which are difficult or impossible to upgrade.

The present invention relates to a process for the preparation of zirconium oxide hydrate from a granular crystallized zirconium oxide (zirconia) obtained by dissociation of zircon at high temperature, with the optional addition of zirconium oxide or of silica, as crystallized zirconium oxide and silica, followed by a selective digestion of the silica with sodium hydroxide in a concentrated solution, which comprises the following steps:

(1) reacting the said granular crystallized zirconium oxide with an at least stoichiometric proportion of solid sodium hydroxide at a temperature of 550° to 1,400° C. to form sodium zirconate, (2) hydrolyzing the sodium zirconate with water so as to produce a suspension of solid zirconium oxide hydrate in an aqueous solution of sodium hydroxide, (3) separating most of the said aqueous solution of sodium hydroxide from the zirconium oxide hydrate, (4) treating the zirconium oxide hydrate obtained in (3), which contains residual sodium hydroxide, with an aqueous solution of an ammonium salt of a strong acid, so as to produce a weak base and a sodium salt, and neutralizing, as it is being formed, the weak base formed with a strong acid, and (5) separating, washing with water and then dewatering the resulting purified zirconium oxide hydrate so as to obtain the latter in the form of a water-dispersible, moist, granular solid.

It should be noted that, although the invention has been defined with regard to the use of sodium hydroxide as an alkaline agent, potassium or lithium hydroxide could be employed instead of the latter. However, the use of sodium hydroxide is preferred because of its availability and its lower cost.

The granular crystallized zirconium oxide (or zirconia) employed as starting material is a commercially available product known as thermal zirconia. Its industrial manufacture is well known and is described in various patents, for example in U.S. Pat. No. 3,749,763, U.S. Pat. No. 3,667,764 (dissociation carried out using a plasma torch), U.S. Pat. No. 3,993,434 (dissociation carried. out in a fluid-wall oven), FR-A-2,554,439 and U.S. Pat. No. 2,924,533 (dissociation carried out in an electric arc furnace) and U.S. Pat. No. 3,811,907, the teachings thereof are incorporated here by reference. Typically, thermal zirconia contains the following impurities, in % by weight relative to the weight of zirconia:

$SiO_2$ = 0.10 to 0.70%, usually approximately 0.45%
$Na_2O$ = 0.02 to 0.30%, usually approximately 0.15%
$Al_2O_3$ = 0.05 to 0.15%, usually approximately 0.10%
$TiO_2$ = 0.05 to 0.25%, usually approximately 0.10%
$Fe_2O_3$ = 0.02 to 0.10%, usually approximately 0.04%
$CaO$ ~ 0.05%
$MgO$ ~ 0.01%
$P_2O_5$ ~ 0.03%

Its average particle size depends on the microstructure of the dissociated zircon granules. It can vary between 0.1 and 15 μm. It is generally between 2 and 5 μm. The surface area of this pulverulent zirconium oxide ranges from 0.8 to 8 m²/g, depending on its particle size, the average value being 3 m²/g. The oxide powder has a crystalline form which is essentially monoclinic. In the case of the finest oxides, the metastable tetragonal phase may be present in proportions of up to 15%.

This pulverulent oxide is insoluble in the majority of reactants. Furthermore, its low surface area does not allow it to be considered as reactive in many applications, in particular in the synthesis of ceramic materials by a solid-solid reaction.

In step (1), this thermal oxide is mixed with solid sodium hydroxide. The minimum weight ratio NaOH/$ZrO_2$ must correspond at least to the stoichiometric quantity for the formation of the sodium zirconate compound $Na_2ZrO_3$, that is a value of at least approximately 0.65. The reaction involved can be written as:

$$2NaOH + ZrO_2 \rightarrow Na_2ZrO_3 + H_2O.$$

It is preferable to employ a slight excess of NaOH in order to promote the formation reaction, that is to say a value of the ratio of 0.70 to 0.85. The pulverulent mixture is baked at a minimum temperature of 550° C., preferably from 850° to 1,400° C., advantageously of the order of 950° C., for a sufficient time to permit the formation of sodium zirconate with a zirconia conversion efficiency of at least 95%.

The compound thus obtained, sodium zirconate, is a brittle white solid with great affinity for water. To prepare zirconia hydrate, it is reacted (step (2)) with water (hydrolysis) at a temperature of 30° to 90° C., preferably approximately 60° C. The hydrolysis time is 10 to 75 minutes, preferably approximately 30 minutes, in a stirred reactor. The following reaction takes place:

$$Na_2ZrO_3 + (n+x)H_2O \rightarrow ZrO_2 \cdot xH_2O + 2NaOH + (n-1)H_2O$$

where x is the quantity of water needed for the hydration of zirconia and n is the quantity of water added with the aim of diluting the soluble effluents. x is of the order of 1 and n can vary within wide limits, since there is no reason to prevent working at an extreme dilution of the soluble effluents. However, it will usually be advantageous to limit the volumes of effluents by working with a quantity of water which is as small as possible, but compatible with the complete dissolution of the soluble effluents and the obtaining of solutions which are stable at an industrially acceptable temperature (below 60° C.). Solutions which are too concentrated can crystallize spontaneously on being cooled or in storage. In practice, n will be preferably between approximately 2.5 and 10.

A suspension of solid zirconia hydrate in a solution of sodium hydroxide is obtained. A concentrated solution of sodium hydroxide can be obtained by adjusting the quantity of hydrolysis water. After separation (step (3)), for example by filtration or dewatering, the sodium hydroxide solution may be recycled, if desired, to the preparation of thermal zirconia, to carry out the selective digestion of silica in the dissociated zircon.

Bearing in mind the proportions of solid or dissolved sodium hydroxide in each of the steps described above, the sodium hydroxide solution generated therein is in excess relative to the requirements dictated by the previous manufacture of thermal zirconia. This excess will make it possible to manufacture thermal zirconia for applications where it can be employed directly. In practice, bearing in mind the yields, of the order of 100 kg of excess thermal zirconia can be manufactured for each tonne of zirconia converted into a hydrate form.

The zirconia hydrate obtained in step (3) is still laden with $Na_2O$ after filtration and washing with water. On average, there remains approximately 7% by weight of $Na_2O$ relative to the $ZrO_2$ content. Subsequent washings with water, even when extended, no longer make it possible to lower this concentration very appreciably. We have found that a treatment (washing) with a solution of a salt of a weak base and of a strong acid at a pH of 3 to 6 (preferably of the order of 5) enables this residual sodium hydroxide to be extracted at a high rate without entailing appreciable dissolution of zirconia hydrate, while the solution volumes are limited.

The salts employed in step (4) are advantageously ammonium salts (for example chloride, nitrate or sulfate), or di- or trialkylammonium salts, such as diethylor triethylammonium chlorides.

The following reaction is involved, in the case of ammonium chloride:

$$NaOH + NH_4Cl \rightarrow NH_4OH + NaCl$$

An aqueous solution containing 50–150 g/l of ammonium chloride is preferably employed. The ammonium ion concentration is generally 1 to 3 moles/liter for a quantity of 3 to 5 moles of ammonium ions per kg of zirconia, and preferably approximately 4 moles/kg. A temperature of 30° to 50° C. and a contact time of 10 to 90 minutes are preferably employed in practice.

The aqueous ammonia formed during the treatment is neutralized as it is being formed by adding a dilute strong acid, preferably the acid forming the anion of the salt. This operation is intended to keep the pH in the required range. In the case of ammonium chloride, hydrochloric acid will be advantageously employed, and this will produce the reaction:

$$NH_4OH + HCl \rightarrow NH_4Cl + H_2O$$

The resulting suspension is then filtered, the purified zirconia hydrate is washed with water and is then dewatered (step (5)). At this stage, it typically contains: $ZrO_2$ 60 to 50%, usually 55% and, complementarily $H_2O$ 40 to 50%, usually 45%.

It also typically contains the following impurities, in % by weight relative to $ZrO_2$:
$SiO_2$: 0.1 to 0.5%, usually 0.3%
$Na_2O$: 0.1 to 0.5%, usually 0.3%
$Al_2O_3$: 0.02 to 0.10%, usually 0.04%
$TiO_2$: 0.05 to 0.25%, usually 0.10%
$Fe_2O_3$: 0.02 to 0.10%, usually 0.04%
CaO: 0.05%
MgO: 0.01%
$P_2O_5$: 0.03%
Cl: 0.04% (in the case of washing with ammonium chloride).

It is in the form of a water-dispersible moist granular solid, the particle size obtained being close to that of the thermal zirconia employed as starting material.

We have also found that, using this process, a zirconia hydrate with a low content (0.01 to 0.1%) of residual anions could be obtained, thus correspondingly reducing the problems linked with their release.

When compared with the abovementioned usual process, the present process has the special feature of performing the purification of zircon, that is to say the removal of silica, while avoiding the coexistence of zirconia hydrate and:
of residues of undigested or converted zircon, and
of silica-rich, easily adsorbed solutions.

Consequently, contamination of zirconia hydrate with residues which can only be removed by redissolving is avoided.

It has the further advantages:

(1) of permitting a major saving, by a factor of the order of 2.9, in the overall usage of sodium hydroxide when the sodium hydroxide separated in step (3) is recycled to the manufacture of thermal zirconia. By way of indication, a sodium hydroxide usage (losses in a nonrecyclable form) of the order of 280 kg/tonne of zirconia produced (expressed as $ZrO_2$) has been recorded, that is 0.46 moles of NaOH/mole of $ZrO_2$, compared with 2 moles used in the reaction.

(2) Bearing in mind that intermediate zirconium salts (oxychloride, basic sulfate) are not resorted to, the usage of concentrated strong acids (sulfuric acid, hydrochloric acid) is virtually insignificant. Only one ammonium salt in a dilute solution whose pH is kept constant by acidifying with an acid (for example that corresponding to the ammonium salt employed) is needed to obtain the required purity. As a result, wastes are limited, in quantity and in concentration, to a mixed solution of a sodium salt and an ammonium salt. In the case of the usual process, solutions of hydrochloric acid plus sodium sulfate and ammonium sulfate are generated.

The following example is given in order to illustrate the present process, no limitation being implied.

EXAMPLE:

The thermal zirconium oxide employed was obtained by plasma decompostion of zircon, followed by a digestion in a hot concentrated solution of sodium hydroxide. Its properties are as follows:
Chemical analysis (% by weight)
$SiO_2 = 0.40\%$, $Na_2O = 0.08\%$, $Al_2O_3 = 0.12\%$,
$TiO_2 = 0.14\%$, $Fe_2O_3 = 0.04\%$ Surface area: 6.5 $m^2/g$
Median diameter: 3.2 $\mu m$.

5 kg of this oxide are mixed with sodium hydroxide in the form of solid pearls, in a proportion of 4.1 kg.

The mixture is baked in an electric oven at 1,000° C., kept for 4 hours at this temperature and then cooled to ambient temperature.

8.108 kg of a white granular solid are obtained. Only the $\alpha$-$Na_2ZrO_3$ crystalline phase is detected by x-ray diffraction.

This solid is freed from lumps to a particle size below 5 mm by a pass through a sieve of corresponding mesh size.

It is brought into contact with 10.5 kg of distilled water in a stirred reactor and kept at 60° C. for 30 minutes.

A suspension of zirconia hydrate in a solution of sodium hydroxide is obtained. This solution is removed by filtration and dewatering.

9.2 kg of sodium hydroxide solution are thus recovered, with a mass concentration of approximately 30% NaOH, which can be reemployed for the manufacture of thermal zirconia. The usage of sodium hydroxide is therefore 275 kg/tonne of $ZrO_2$.

The zirconia hydrate is washed with 5 kg of water and it is then suspended in a solution of ammonium chloride at a concentration of 120 g/l. The quantity of washing solution is 10 kg. The suspension is kept at 45° C. for 40 minutes. During the reslurrying, a 10% solution of hydrochloric acid is added so as to keep the pH at about 4 to 5, which results in an addition of 4 kg of acid solution.

The suspension is then filtered and dewatered and the zirconia hydrate is washed with 5 kg of water and is dewatered. The final product is in the form of a moist granular mass weighing 9.805 kg.

Its characteristics are as follows:
Chemical analysis (% by weight) $SiO_2 = 0.20\%$, $Na_2O = 0.20\%$, $Al_2O_3 = 0.03\%$, $TiO_2 = 0.07\%$, $Fe_2O_3 = 0.02\%$, $H_2O = 49.0\%$.

The chlorine content is 450 ppm.
Median diameter: 5 $\mu m$.
Unconverted thermal $ZrO_2$ content: 2%.

It is self-evident that the embodiment described is merely an example and that it could be modified, particularly by the substitution of technical equivalents, without thereby departing from the scope of the invention.

We claim:

1. A process for the preparation of zirconium oxide hydrate which is in the form of a water-dispersible, moist, granular solid, said process comprising the steps of:

(1) reacting granular crystallized zirconia with an at least stoichiometric proportion of solid sodium hydroxide at a temperature of 550° to 1,400° C. to form sodium zirconate, (2) hydrolyzing said sodium zirconate with water so as to produce a suspension of solid zirconium oxide hydrate in an aqueous solution of sodium hydroxide, (3) separating most of said aqueous solution of sodium hydroxide from the zirconium oxide hydrate, (4) treating the zirconium oxide hydrate obtained in step (3), which contains residual sodium hydroxide, with an aqueous solution of an ammonium salt of a strong acid, so as to produce a weak base and a sodium salt, and neutralizing, as it is being formed, the weak base formed with a strong acid, and (5) separating, washing with water and then dewatering the resulting purified zirconium oxide hydrate so as to obtain the latter in the form of a water-dispersible, moist, granular solid.

2. The process as claimed in claim 1, wherein the proportion of sodium hydroxide employed in step (1) is such that the weight ratio $NaOH/ZrO_2$ is between 0.70 and 0.85.

3. The process as claimed in claim 1, wherein the duration of step (1) is such that the zirconia conversion efficiency is at least 95%.

4. The process as claimed in claim 1, wherein, in step (2), a proportion of water of between 3.5 and 11 times the molar proportion of sodium zirconate formed in step (1) is added.

5. The process as claimed in claim 1, wherein the hydrolysis (2) is performed at a temperature of 30° to 90° C.

6. The process as claimed in claim 5, wherein the hydrolysis (2) is performed at a temperature of approximately 60° C.

7. The process as claimed in claim 1, wherein the sodium hydroxide separated in step (3) is recycled and employed for selectively digesting silica in thermally dissociated zircon.

8. The process as claimed in claim 1, wherein an ammonium or di- or trialkylammonium chloride, nitrate or sulfate is employed in step (4).

9. The process as claimed in claim 1, wherein the weak base formed is ammonium hydroxide and wherein the latter is neutralized with the strong acid corresponding to the anion of the ammonium salt employed.

10. The process as claimed in claim 1, wherein potassium hydroxide or lithium hydroxide is substituted for sodium hydroxide.

* * * * *